United States Patent [19]
Grolitsch

[11] 3,892,880
[45] July 1, 1975

[54] METHOD FOR THE MANUFACTURE OF CRYSTALLINE, FLOWABLE, STABLE FAT POWDERS OR MIXTURES OF SUCH FAT POWDERS WITH OTHER POWDERY MATERIALS

[76] Inventor: Erhard Grolitsch, Strauchergasse 23, Graz, Austria

[22] Filed: Aug. 10, 1972

[21] Appl. No.: 279,740

Related U.S. Application Data
[63] Continuation-in-part of Ser. No. 851,190, Aug. 19, 1969, abandoned.

[52] U.S. Cl. ............... 426/541; 426/555; 426/588; 426/607; 426/609; 426/613; 426/388; 426/417; 426/548
[51] Int. Cl. ............................................. A23d 5/00
[58] Field of Search ........... 426/417, 357, 358, 343, 426/345, 372, 362, 363, 388, 328

[56] References Cited
UNITED STATES PATENTS
| | | | |
|---|---|---|---|
| 1,329,845 | 2/1920 | Overbeck | 426/194 |
| 2,951,262 | 9/1960 | Dorman et al. | 264/297 |

FOREIGN PATENTS OR APPLICATIONS
| | | |
|---|---|---|
| 20,715 | 6/1929 | Australia |

*Primary Examiner*—Joseph M. Golian
*Attorney, Agent, or Firm*—Woodhams, Blanchard & Flynn

[57] ABSTRACT

A method for the manufacture of crystalline, flowable fat powders by spraying the fat, which has been melted by heat, into cold air. Before the spraying, the fat is subjected to a pretreatment in which the low-melting α- and/or β'-crystals which are contained therein are converted as much as possible into high-melting β-fat crystal nuclei by first heating the fat above its clear melting point, then quickly cooling it to a temperature in the lower third of the temperature range between its congeal point and its clear melting point, holding it at said temperature so as to complete β-fat crystal nucleus formation and then slowly reheating it until it attains a low viscosity in which it is suitable for spraying, the reheating being carried out so that the β-fat crystal nuclei are not substantially destroyed. The crystalline fat powder which is obtained by spraying the liquid fat into a dry, cold air stream is then subjected to an after-treatment (hereinafter referred to as the "ripening treatment") by reheating same in a dry gas atmosphere and at a temperature in the range of from 0° to 10°C, in order to convert residual α or β' crystals therein substantially into the form of relatively high-melting β-fat crystals.

12 Claims, 1 Drawing Figure

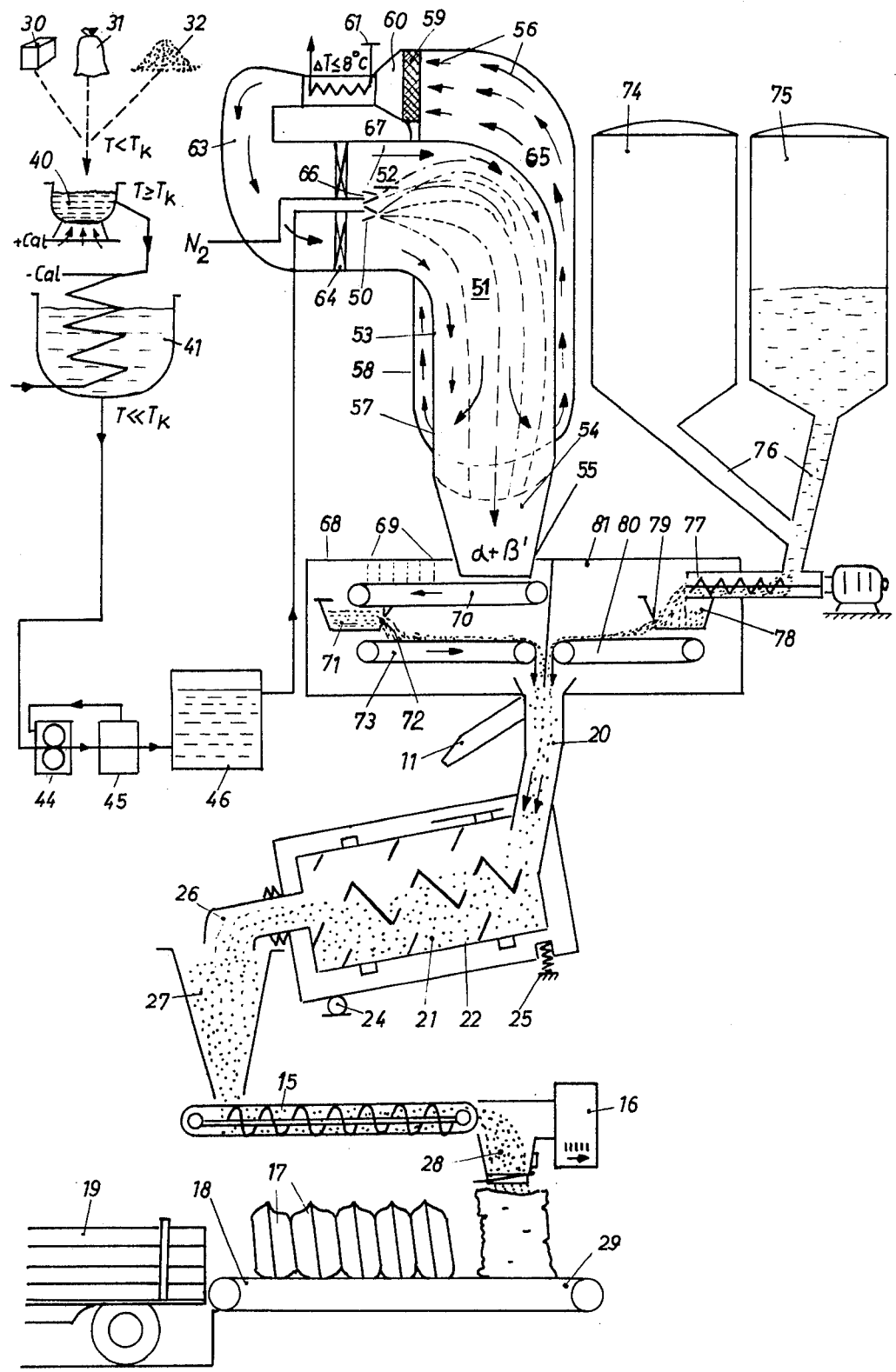

METHOD FOR THE MANUFACTURE OF CRYSTALLINE, FLOWABLE, STABLE FAT POWDERS OR MIXTURES OF SUCH FAT POWDERS WITH OTHER POWDERY MATERIALS

CROSS REFERENCE TO RELATED APPLICATION

This application is a continuation-in-part of my copending U.S. application Ser. No. 851,190, filed Aug. 19, 1969, now abandoned.

BACKGROUND OF THE INVENTION

1. Field of the Invention

The invention relates to a method for the manufacture of crystalline, flowable, stable fat powders, or mixtures of such fat powders with powdery adjuncts such as non-fat, powdered solids.

In the following description, the term "fat" shall refer to edible fats and oils consisting essentially of triglycerides of straight chain saturated and unsaturated monocarboxylic acids having from 4 to 24 carbon atoms and obtained, for example, from natural fats and oils. Suitable sources of fat are vegetable fats and oils, such as soybean oil, cottonseed oil, corn oil, peanut oil, safflower oil, sunflower oil and the like, meat fats such as lard and tallow, marine oils such as whale oil, herring oil and the like, and milk (butterfat). As is well known, such natural materials are mixtures of various triglycerides and they contain minor amounts of mono- and diglycerides, phospholipids, sterols and tocopherols. It is preferred that the amounts of these impurities be reduced to the lowest commercially practical levels by known refining and degumming treatments to obtain the starting fat material for the process of this invention.

It is known that homogeneous powdery mixtures of fats with other solids can be prepared satisfactorily only if the components of the mixture are, both before and during the mixing process, in the same physical condition and of similar fine particle size. Also, the surface characteristics of all the powdery components must be substantially the same. Sticky and wet substances are poor in mixability and are not suitable for the manufacture of homogeneous mixtures. Thus, in the known methods for the manufacture of such mixtures, it has been attempted to achieve a continuous mixing of (1) fats of vegetable and animal origin with (2) powdery, organic and inorganic, non-fat solids, such as skim milk, whey powder, starch powder, flour, soya powder, phosphates, highly dispersed silicic acid and the like, by using the fats in a crystalline, powdery form. However, it was found to be very difficult to manufacture fat powder having the characteristics required for this purpose. In particular, practically all fat powders which have been produced according to the known methods have the tendency, particularly after storage at room temperature for a short time, to become sticky and to form lumps, that is, the powder agglomerates to form larger lumps, or to stick together to form a solid mass. This tendency could not be overcome even by mixing the fat powders immediately after they were manufactured and at a relatively low temperature with the additional powdery substances, even though the additional powdery substances were supposed to encapsulate the individual fat particles and to prevent their sticking together.

The present invention is based on the discovery that in a method for the manufacture of fat powders by spraying liquid fat into a dry, cold air stream, a product can be obtained which possesses superior characteristics, particularly with respect to storage stability, flowability and mixability, provided that the fat is subjected prior to the spraying to a special pretreatment in which the molten fat melt is substantially freed of low-melting $\alpha$- and $\beta'$ crystal nuclei and in which a high concentration of high-melting $\beta$-fat crystal nuclei are produced, and provided further that the fat powder obtained by spraying in the cold air stream in addition is subsequently to a so-called ripening treatment, during which it is belived an after-crystallization takes place by means of which at least a portion of the fat which is not present in the form of $\beta$-crystals is converted into the $\beta$-crystalline structure. By the method of the invention there can be obtained a fat powder which is flowable by itself or when mixed with other powdery, non-fat solids in any desired mixing weight ratio, and which remains flowable after a long storage at room temperature. The fat powder thus can be mixed satisfactorily with other powdery, non-fat substances after long storage at room temperature (for example 10° to 25°C), for example, in continuously operating drum mixers or other continuous flow mixers, in any desired, exactly adjustable mixing weight ratios.

2. Description of the Prior Art

Of the many references in which methods are described for the manufacture of crystalline fat powders or mixtures of fat powders and other, non-fat powders, Australian Pat. No. 20,715/29 is believed to be the most pertinent reference to the process described herein. Generally speaking, this patent discloses the manufacture of fat powders, the particles of which are encapsulated by an inert powder which prevents sticking together of the individual fat particles, by melting a fat or wax which, if necessary, contains in suspension a non-fat solid powder, and solidifying the fat or wax by spraying same into a cold air stream. However, it has been found that fat powders produced in this manner have acceptable flowability for a very short time only, and this is maintained only if they are kept at relatively low temperatures. For this reason the fat powders which are manufactured according to this known method must be mixed and encapsulated directly after they are manufactured with a fine powder in order to encapsulate the individual fat particles and prevent same from sticking together. However, even this measure does not assure that the thus-obtained product will remain flowable for a long period of time during storage at room temperature or that it will be mixable with other powdery solids.

Surprisingly, it has now been found that a product having the above-described desirable characteristics can be obtained provided that very special conditions are followed during the spraying of the fatty mixture in a method of the type described in the Australian Pat. No. 20, 715/29 and, particularly, care is taken so that the cold air stream into which the fat is sprayed is dried carefully, further provided that the fat prior to the spraying is subjected to a special precrystallization treatment which is believed to cause many high-melting $\beta$-fatty crystal nuclei to be developed in the molten fat, further provided that the fat powder is subjected to an after treatment in a dry atmosphere, by means of which it is believed that there takes place a restructuring of the portion of the fat powder which is not present in the form of high-melting β-crystals, to convert same to the β-crystalline form.

SUMMARY OF THE INVENTION

The invention provides a method for the manufacture of crystalline, flowable and stable fat powders, or mixtures of such fat powders with powdery carrier and/or adjunct materials, from fats which contain, if necessary, suspended, non-fat powdery solids, or fat mixtures or rat-oil-mixtures (hereinafter collectively referred to as fat), which fat has a clear melting point of preferably at least approximately 20°C., in which:

a. the starting fat is melted by heating same to a temperature which lies at a maximum approximately 15°C. above its clear melting point. In this description and claims, the term "clear melting point" shall mean the temperature at which the fat becomes completely clear, as determined by AOCS Method Cc 1–25;

b. the molten fat (melt) is, if desired, mixed with one or more powdery adjunct materials;

c. the melt is homogenized;

d. the melt is sprayed through atomizing nozzles into a dry cold air stream flowing through a crystallization zone, which air stream has a temperature in a range of approximately minus 15° to minus 30°C., and e. the thus obtained fat powder is mixed, if necessary, with one or several powder carrier material(s);

the invention being characterized by the further improvements that, prior to the spraying step (step d);

1. the homogenized, molten fat, at a temperature in the range of between its clear melting point and a temperature which is approximately 15°C. higher than said clear melting point, is quickly cooled, preferably with stirring, to a temperature which lies in the lower third of the temperature range between the congeal point of the fat, as determined by AOCS Method Cc 14–59, and the clear melting point of the fat, in order to produce as many as possible high-melting β-fat crystal nuclei;

2. the fat is held at this temperature for from approximately 2 to approximately 30 minutes to complete the development of the desired β-fat crystal nuclei;

3. the fat is then again heated up until it attains the viscosity which is desired for the spraying, which heating simultaneously dissolves most of any undesired α- and/or β'-fat crystal nuclei which may have formed during the above steps (1) and/or (2), subject to the requirement that the fat is heated up to a temperature, the upper limit of which is at least 10% below the clear melting point of the fat so that the previously formed β-fatty crystal nuclei are not dissolved; and after the spraying step (step d), 4. the crystalline fat powder obtained in step (d) is subjected to a ripening treatment by holding it in a dry atmosphere for a time period in the range of from approximately 0.5 to approximately 10 minutes at a temperature of approximately 0°C. to approximately plus 10°C.

As will be shown hereinafter by detailed exemplary embodiments and comparison experiments, in the method according to this invention both (A) the above method steps (1) to (3), which are sometimes hereinafter collectively referred to by the term "pretreatment", by means of which a liquid fat phase is obtained having a viscosity which is suitable for spraying to obtain fat particles of the desired size, which phase contains a high concentration of high-melting β-crystal nuclei and is substantially free of low-melting α- and/or β'-crystal nuclei, and (B) the method step (4), which is sometimes hereinafter referred to as the "ripening treatment", are critical because a product (fat powder) having the desired characteristics can be obtained only if both the pretreatment and also ripening treatment, according to this invention, are carried out.

DETAILED DESCRIPTION

Materials used

As the starting material, it is possible to use in the method of the invention natural fats, fat mixtures and mixtures of one or several fats and one or several oils. Advantageously for the method of the present invention there are used fats, which are usually mixtures of fats or fat-oil mixtures, which are solid at a temperature of approximately 20°C. Particularly preferred as the starting material are edible fats of natural origin, such as beef tallow, lard, fish oil, cottonseed oil, corn oil, safflower oil, cacao butter, sunflower oil, palm oil, peanut oil, palm kernel oil, coconut oil, etc. In the case of fats and oils which in their natural state are liquid at 20°C., the same can be hardened by hydrogenation in accordance with known techniques so that they are solid at a temperature of about 20°C. A fat material which is particularly suitable for the method of the invention is milk fat (butter fat).

In the group of fats which are to be used in the method of this invention, milk fat has a special position because it has, based on its origin and occurrence, a more versatile orientation than most other fats. Just like the other fats, milk fat repels foreign powdery substances and it is difficult to incorporate same in the liquid phase into non-milk powdery substances. However, milk fat has the characteristic that in the liquid phase it will well absorb and suspend fat-free milk particles in the powdery form up to a certain saturation concentration.

This characteristic of milk fat results from the property that the fat does not exist as free fat in the milk, but rather exists as an oil-in-water emulsion. The fat particles, or rather droplets, in the milk are always encapsulated by a multi-layered membrane, the innermost layer of which as a rule consists of high-melting triglycerides, the second layer of which consists of phosphatides or rather phospholipids and the outermost layer of which is membrane protein. This membrane is probably the cause for the fact that between milk fat and the remaining constituents of milk there exists such a strong affinity that even after a mechanical decomposition of the milk into its individual components there remains a strong tendency for the milk to return again to its original condition, i.e., to reconstitute. However, during the manufacture of dried milk products, such as powdered whole milk or powdered cream, by the common spray drying process, for reasons which have not yet been completely clarified, this reconstitution characteristic of the solid particles of the milk as well as other important characteristics of these substances, are often lost. For this reason the method of the present invention is particularly suitable for the manufacture of milk fat-containing dried products. It is thereby necessary to use, according to the invention, as the starting fat, milk fat which has been carefully separated from the remaining constituents of the milk. In this embodiment of the method of the invention, one can use pure milk fat as the starting material, but it is preferred to use milk fat to which prior to or during the pretreatment in the liquid phase there is admixed a desired amount of non-fat milk substances which have been obtained by drying of fat-free milk in the common manner. In other words, in this preferred embodiment the invention advantageously uses a suspension of non-fat dry milk solids in milk fat as the starting material.

According to the method of the invention, it is possible to add to the fats which are used as the starting material, other powdery solid adjuncts common for use in edible food fat products, such as antioxidants and/or emulsifiers, and to suspend same therein.

After the conversion, by the method of the invention, of the starting material into a flowable, storage-stable and mixable fat powder, there can be added to the fat powder, if desired, in any desired weight ratio, amounts of powdery carriers and/or adjuncts, such as skim milk powder, whey powder, baking flour, soy-bean flour, high-dispersive silicic acid, etc. to obtain a homogeneous final product, in accordance with well known techniques.

PROCESS CONDITIONS

In the method of the invention, in the method step (a), as already mentioned, the fat is first heated to a temperature which lies above its clear melting point. The purpose of this measure is to obtain a molten fat which is completely free of any fat crystal nuclei. To achieve this with certainty, it is advisable to heat the fat to a temperature which lies distinctly above its clear melting point. However, the fat should be heated to a temperature more than 15°C. above its clear melting point. This upper limit of the melting temperature is observed because at a temperature which is 15°C. above the clear melting point, the purpose of the melting, that is, the dissolving of all the fat crystal nuclei has already with certainty been achieved and it would thus be uneconomical to heat the fat still further. In addition, the subsequent cooling of the fat melt is supposed to take place quickly for reasons which are discussed in detail later on. Because fat is a poor heat conductor, such quick cooling is difficult, so that it is advantageous for this reason also not to make the amount of cooling that must be carried out unnecessarily large. Finally, heating of the fat to a higher temperature is undesirable because it increases the danger of thermal or oxidative damage of the fat.

As has already been mentioned, prior to the spraying, the fat can, if desired, be mixed with one or several powder adjunct materials, such as antioxidants and/or emulsifiers, and the same can be homogeneously suspended in the fat melt. When such adjunct materials are used, one can add them and mix them with the fat, at any desired point during the course of the method prior to the spraying of the fat. However, the addition of same is done most advantageously after the fat has been melted and prior to the cooling of the fat melt.

After heating the fat to a temperature which lies between the clear melting point and a 15°C. higher temperature, the fat is cooled quickly, preferably with stirring, to a temperature which lies in the lower third of the temperature range between the conqeal point and the clear melting point of the fat. The purpose of the cooling is to produce in the fat melt as many as possible of high-melting $\beta$-fat crystal nuclei, while at the same time avoiding the formation of relatively low-melting $\alpha$ and $\beta'$ fat crystal nuclei as much as possible. Since a substance recrystallized from a melt or solution is known, as a rule, to be more fine-grained (smaller particle size) if the solution becomes supersaturated more strongly and quickly, it is advisable in this step to cool off the fat melt as quickly as possible with the mechanism available and in consideration of the poor heat conductivity of the fat. However, care must be taken to avoid the risk, during the cooling, of reducing the temperature of the fat to or below the congeal point of the fat, because if this were to occur there would exist the danger that a considerable amount of relatively low-melting $\alpha$- and/or $\beta'$-fat crystal nuclei would be formed, which in turn would nullify the effect of the previous destruction of all low-melting fatty crystals achieved during the earlier melting of the fat and/or the fat mass would become stiff.

After cooling the fat to a temperature which lies in the lower third of the temperature range between its congeal point and its clear melting point, the fat melt is advantageously held for a period of time at that temperature so that the desired development of the $\beta$-fat crystal nuclei, which is not a suddenly occurring process, can be completed. The length of time required for this nuclei development differs for each individual fat and depends furthermore on the temperature used and other factors. It is therefore not possible to give exact limits of the duration of the time period during which the fat is to be maintained at the temperature in the lower third of the temperature range between the congeal point and the clear melting point of the fat in question. However, the length of this time period generally is between approximately 2 and approximately 30 minutes, many times between approximately 4 and approximately 15 minutes and particularly between 5 and approximately 10 minutes. However, the most favorable time can be determined by the man skilled in the art, without any difficulty, within the above-given boundary values, by routine tests.

Because the viscosity of fat tempered in this manner is as a rule too high to permit a sufficiently fine atomizing and spraying of the fat, after the tempering, the fat is again heated until the melt has a viscosity which is sufficiently low for spraying. During this viscosity adjustment, it is not permitted, of course, for the temperature of the fat to reach or exceed the clear melting point temperature of the fat, in order to avoid destruction of the $\beta$-fat crystal nuclei which were obtained by the preceding method steps. To avoid this with certainty, the fat should not be heated above a temperature which is at least 10% below the clear melting point of the fat. For example, if the fat has a clear melting point of 40°C, in the viscosity adjusting step the fat can be heated to a temperature of not more than 36°C. To prevent exceeding this upper temperature limit, the heating is advantageously done slowly, even though there exists the danger that the number of the desired $\beta$-fat crystal nuclei contained in the fat melt may be reduced because individual $\beta$-fat crystal nuclei grow at the expense of other $\beta$-fat crystal nuclei, whereby the total number of the desired $\beta$-fat crystal nuclei per unit volume may be reduced in the melt. On the other hand, a relatively slow heating offers the advantage that undesired $\alpha$- and $\beta'$-fat crystal nuclei that may have formed in the method steps (1) and (2) can thereby at least partly again dissolve in the fat melt.

The precrystallization steps, that is, the method steps (2) and (3) and, if desired, the method step (1) can advantageously be carried out continuously in so-called combinators, for example, apparatus manufactured by the Firm Schröder & Co. in Lübeck, Germany, or so-called DS-coolers of Bergedorfer Eisenwerke in Hamburg Bergedorf, Germany, of the type "Austra".

The subsequent spraying step, step (d) is, as already mentioned above, actually known and therefore needs to be discussed in further detail only with respect to the conditions to be applied therein, which are particularly critical within the scope of the invention. In this method step it is particularly important that the humidity (concentration of water vapor) in the crystallization chamber is kept so low that no water can be condensed, in liquid or solid forms on the fat particles. This means that the dew point of the cold air stream used to crystallize the fat particles must be below the lowest temperature in the crystallization chamber. A theoretical explanation for the practical observation that the presence of moisture on the crystallizing fat particles unfavorably influences the characteristics of the final product, has not been found to date. Furthermore, it is important in this method step to cool the sprayed fat as much as possible suddenly to low temperatures, advantageously in the range of approximately minus 15° to minus 30°C. by the use of a stream of dry air at that temperature. The reason that only a very quick, sudden cooling of the sprayed fat results in a usable product is probably due to the fact that the temperature range within which the undesired low-melting $\alpha$- and $\beta'$-fat crystal nuclei can form is passed through so quickly that only a relatively small amount of these undesired fat crystal modifications can form. Thus, the liquid fat is crystallized mainly on the already preformed $\beta$-fat crystal nuclei or solidifies amorphously. Since tha atomized fat, according to experience, particularly for so long as it is not yet solidified, is rather oxidation sensitive, in the method of the invention, advantageously nitrogen gas is used to treat the fat droplets to protect them against oxidation, in a known manner. This can, for example, be done by spraying the fat into a nitrogen stream or by blowing into the fat spray emerging from the spraying nozzle a stream of nitrogen gas which is free of oxygen as much as possible. Crystal formation takes place thereby starting as soon as the atomized fat stream leaves the nozzle exit. During this main step of the crystallization process, due to the cold temperature employed and the nitrogen, principally $\beta$-fat crystals, and possibly some $\alpha$ and $\beta'$ crystals, are formed which crystals are provided with an antioxidative protective treatment.

In the method of the invention, the crystalline fat powder which is obtained in the method step (d) is thereafter subjected to a ripening treatment in which it is maintained in a dry (substantially moisture-free) atmosphere for approximately 0.5 to approximately 10 minutes at a temperature of approximately 0° to approximately plus 10°C. This after-treatment, which is identified as a ripening treatment is critical because without it, as will be seen from the following comparative examples, no product with completely satisfactory characteristics can be obtained. This ripening process is carried out according to the invention advantageously in a chamber and, preferably, by placing a thin layer of fat powder on a conveyor belt and moving same through the chamber in which a dry air atmosphere is maintained. The dew point of the dry air atmosphere is below the lowest temperature in the ripening zone so that no liquid or solid water becomes present therein. In this ripening treatment a restructuring of the fat powder takes place, probably by causing fat coagulated amorphously or present in the form of $\alpha$- or $\beta'$-crystals to grow on the $\beta$-fat crystals already present in a high concentration in the fat powder. This restructuring cannot take place at the very low temperatures of approximately minus 15° to minus 30°C. which exist in the crystallization chamber and it does not take place even at the temperatures used during the ripening treatment, or in any case it does not take place in the desired manner, unless the fat particles are ripened in a dry atmosphere as can be concluded from the results of the following examples. The reason why the presence of moisture (condensable water vapor) during the ripening treatment interferes with the restructuring has, however, not yet been completely clarified. The process which takes place during the ripening treatment are obviously time-dependent so that the fatty powder must be kept for a certain period of time, in a dry atmosphere, at a temperature in the above-mentioned range in order to achieve the desired effect to a full extent. The time required for the ripening treatment lies as a rule, as already mentioned, between approximately 0.5 and 10 minutes, often between 1 and 8 minutes, more often in a range of 2 to 6 minutes and very often in practice between 3 and 5 minutes. According to the inventive restructuring procedure, the size of the fat crystals which form after the spraying, which agglomerate to crystalline fat particles of a size of approximately 10 to 50 $\mu$m and which have a clearly powder character can be influenced particularly additionally by this treatment. Thus it is possible to produce fat crystals having a size of the order of magnitude of approximately 0.5 to 5 $\mu$m, whereby a portion of the fat crystals have submicroscopic dimensions. The crystal formation capability of the fat phase depends thereby on the type and extent of the treatment intensity which in turn must be adjusted to the respective fat composition. An important factor is the size of the atomized liquid fat particles at the moment they come into contact with the cold medium (cold air stream) in the crystallization zone. By using a finer spraying, that is, by reducing the size of the sprayed atomized fat particles, the crystallization speed can be increased and through it the entire restructuring process can be speeded up or rather controlled. A prerequisite herefore is the purity of the fat substance, that is, the fat must be free of accompanying substances which contaminate the fat. Thus, it is desired to use fats from which natural impurities such as phospholipids, sterols, etc. have been removed by known degumming and refining treatments. Dry substances in power form which are incorporated into the fat phase and which are insoluble in fat do not interfere.

In the case of fat mixtures which are very difficult to crystallize, it may be advantageous to perform a further crystallization treatment after the ripening treatment by contacting the fat powder with liquid nitrogen. The fat powder receives thereby a second cold shock which acts on the less stable $\alpha$ and $\beta'$ crystal forms and converts same into the more stable crystal modification, that is, the $\beta$ crystals. The liquid nitrogen flow rate is chosen so that the temperature of the fat powder is reduced to from minus 25° to minus 30°C. in the second cold shock zone. After this secondary crystallization treatment, advantageously a further tempering of the fat crystal powder takes place which can be identified as an after ripening treatment. The after-ripening treatment is done under the same conditions as the first ripening treatment and lasts advantageously for up to approximately 2 minutes during which, as in the case of the first ripening treatment, moisture must be kept away from the fatty powder. The temperature during the after ripening treatment is kept advantageously also in the range of approximately 0° to plus 10°C.

As already mentioned, the crystalline fat powder manufactured according to the invention preferably is mixed with other powdery adjuncts and/or carrier materials. For this purpose according to the invention, it is advantageous to use continuously operating drum mixers or other continuous flow mixers, to which the fat powder is fed at the same rate per unit of time as it is formed by the preceding method steps. Advantageously, the fat crystal powder is moved on a belt which runs over a belt scale which controls a quickly reacting dosaging device through which the carrier material(s) and/or adjuncts which are to be mixed with the fat powder is or are fed to the mixer in such amounts that a predetermined desired mixing weight ratio between the fatty powder and carrier material(s) and/or adjuncts is always exactly kept.

BRIEF DESCRIPTION OF THE DRAWING

The drawing is a schematic view of a preferred form of apparatus for carrying out the invention.

APPARATUS FOR CARRYING OUT A PREFERRED EMBODIMENT OF THE INVENTION

The drawing indicates the delivery of the fat components in a pure condition from a container 30, a sack 31 and/or a pile 32 of loose bulk material. For the pretreatment, the fats are placed into a melting container 40 in which they are melted to a temperature (T) which is no higher than 15°C. above the clear melting point ($T_k$) of the fat, the fats are mixed and, if necessary, homogenized. It is possible to add to the melted fats, if necessary or desired, dry, fine particles of non-fat substances in order, as has been discussed earlier, to maintain or achieve desired characteristics of the final fat powder product. Particularly in adding fine particulate substances care must be taken that the viscosity which is required for spraying to prepare a fat powder of the desired particle fineness is maintained. After sufficient mixing and, if necessary, homogenizing, the liquid fat at a temperature above its clear melting point is fed into a temperature-regulated container 41 in which it is quickly cooled down to a temperature (T) which lies in the lower third of the temperature range between the congeal point and the clear melting point of the fat. Then it is held in the temperature-regulated container 41, as already mentioned, for approximately 2 to 30 minutes at said temperature, whereafter it is slowly heated to a temperature at which it has the desired viscosity for atomizing and spraying, which latter temperature is at least approximately 10% below the clear melting point of the fat. From the temperature regulated container 41 the fat is then fed through a pump 44 which is controlled by a flow rate measuring device 45 to a pressure or constant level container 46.

The fat, which is in this manner pretreated, is then fed at a selected pressure and at a selected flow rate, while its temperature is maintained close to, but below, its clear melting point to atomizing and spray nozzles 50 in a crystallization chamber 51. The viscosity of the fat, the spray pressure and flow rate of the fat can be selected in accordance with conventional techniques as used, for example, in the spray drying of milk.

The crystallization chamber 51 has a horizontal channel 52 which communicates with an upright cylinder 53 having at its lower end an exit funnel 54 equipped with a vibration mechanism 55 to form a regulatable outlet from said chamber. The crystallization channel 52 is supplied with cold, dry air 56 having a dew point below the lowest temperature in the crystallization zone 51–53. The cold dry air flows in concurrent flow with the fat particles through the channel 52 into the upright cylinder 53. The cold dry air is removed from the cylinder 53 through channels 58 and is recycled through a filter system 59, a condenser 60, a cooling mechanism 61, a dehumidifier and a return channel 63 to re-enter the chamber as cold dry air which has been freed from fat particles, recooled to the desired inlet temperature and which has been dehumidified so that it has a dew point below the lowest temperature in the crystallization zone 51–53. The amount of air movement is controlled in such a manner that the air temperature from the time it enters the crystallization chamber until the time it is removed therefrom does not increase more than about 8°C. Guide or baffle plates 64 located in the zone adjacent the fat spray nozzles 50 insure an evenly distributed stream of air and, if necessary, insure an intensive contacting of the fat and air in the crystallization chamber 51 by means of controlled air guidance.

The liquid fat enters the crystallization channel 52 from the nozzles 50 in form of atomized globules of fat 65 as illustrated in dashed lines. The sprayed globules of fat 65 are contacted with nitrogen gas 67 supplied through a further nozzle 66 as is illustrated by the chain-dotted lines. The fat powder formed in the crystallization chamber 51 is continuously removed from the exit funnel 54 due to the operations of the vibration mechanism.

The ripening treatment takes place in a chamber 68 or a temperature -regulated channel in which the fatty powder is held in a dry air atmosphere for approximately 0.5 to 10 minutes at a temperature of 0° to plus 10°C. Small amounts of liquid nitrogen can be sprayed, if needed, from nozzles 69 onto the fat powder. A uniform nitrogen addition is achieved by spraying the fat powder with liquid nitrogen as the fat powder is transported on a conveyor belt 70 from below the vibration mechanism 55 to an intermediate container 71. The intermediate container 71 has a metered outlet 72 which is automatically operable through the fill weight or through remote control, through which outlet the fatty powder flows in an exactly metered amount onto a further conveyor belt 73. By this time, the fatty powder has been restructured in accordance with this invention and it can be mixed with the adjunct and/or carrier substances which are stored in containers 74, 75 etc. The adjunct or carrier substances are fed from the containers through feed channels 76 and by means of a conveyor worm 77 which is controlled so as to feed the adjunct or carrier substances at a controlled rate coordinated with the feed rate of the fat powder from the devices 70 and 73. The adjunct or carrier substances are fed by one or several devices 77 to 80, which are advantageously arranged for conditioning the admixture substances also in a humidity-controlled and temperature-controlled chamber 81. Both the fat powder and the admixture powder substances flow at the same time through chute 20 into a continuous flow mixer 21. The mixer 21 comprises a rotating drum 22 having mixing blades which are cup-shaped and extend from the inner wall into the inside and which lift the mixture during each rotation and through this action effect an intensive bulk mixing. The continuous flow mixer 21 is supported tiltably in a roller bearing 24 on its outlet end and it can be inclined through a mechanical, hydraulic or electrical elevation adjustment mechanism 25 about the axis of the roller bearing 24. Thus by changing the inclination of the drum 22 the speed of travel of the bulk material can be changed. The final product is continuously fed from the continuous flow mixer 21 as a homogeneous mixture through an outlet channel 26 to a collecting funnel 27. From the collecting funnel the final product is fed by a screw conveyor 15 to a packing mechanism which is coupled to a filling scale 16. A conveyor belt 29 moves the filled sacks 17 directly to a loading ramp 18 from whence they are placed on other transport means 19, for example, trucks, railroad freight cars, etc.

The invention will be further discussed hereinafter in connection with exemplary embodiments and comparative tests which, however, are not to be considered as limiting.

Example 1

As the starting material there was used a fat mixture of the following composition (% by weight):
50% marine oil (hydrogenated - Iodine value: 54)
30% beef tallow (Iodine value: 38)
16% vegetable fats and oils consisting of 5% coconut oil (iodine value: 8); 4% palm oil (iodine value: 50); 4% soybean oil (iodine value: 35) and 3% soybean oil (iodine value: 130) 4% emulsifiers (3% lecithin + 1% monoglyceride)
Clear melting point: 39.4°C., congeal point: 30.2°C.

The above fat mixture was heated to 54°C. and was homogenized at the same temperature. After the homogenization, the melt was cooled off to 33°C. using cooling water of a temperature of 20°C. flowing in indirect heat exchange relationship under continuous stirring. The fat phase started to become cloudy at a temperature of 36°C. The cloudiness increased as the fat was further cooled. When the temperature of the fat reached 33°C. after about 30 minutes cooling time, the cooling water temperature was increased to 33°C. This temperature was held for 7 minutes, after which the fat was heated up to 35°C. and was sprayed thereafter. The spraying conditions were adjusted in such a manner that the particle size of the fat globules was on the average about 30 $\mu$m. The spraying conditions were: pressure 12kg/cm$^2$, flow rate of fat 10kg/min, and nozzle diameter 2mm. Air at temperature of −28°C. and having a relative humidity corresponding to a dew point of −35°C. was flowed into the crystallization chamber at a rate of 350m$^3$ per minute to solidify the fat particles. The thus produced fat powder was discharged from the crystallization chamber with the help of a vibrating device and was placed on a conveyor belt which moved in a temperature-controlled, dehumidified chamber. The running speed of this conveyor belt was controlled so that the fat powder remained in the chamber for 4 minutes. The temperature in the chamber was 2°C. A weighing device was installed in the last fifth of the length of the conveyor belt and it was connected to control a carrier substance conveyor so that the carrier substance conveyor delivered fine soybean flour, used as the admixture substance, at such a rate of speed that there was effected a constant mixing relationship of 80 wt. % fatty powder and 20 wt.% fine soybean flour. The two constituents were homogeneously mixed in a continuous flow mixer. The thus obtained product was suitable as a milk substitute product.

After the concentrate was produced, pure fat powder was produced in the same manner, without adding soybean flour, and was placed into boxes.

The products which were manufactured as described above were suitable for a variety of purposes as edible products, such as milk substitutes, powdered shortenings, etc. The fat powder was stable and even after storage for six months' time was well capable of being mixed, had a stable $\beta$-crystal structure to a high degree, was flowable, maintained its characteristics, was resistant to oxidative decomposition and was constant in its emulsibility. The concentrate produced therefrom was dry in spite of a high amount (80 wt.%) of fat, was readily flowable, oxidation resistant and showed no change after being stored for six months.

comparative Example 1

The same fat mixture as used in Example 1 was crystallized, without pretreatment, for comparison purposes, by heating the fat mixture to 54°C., homogenizing same thereafter and then spraying it immediately in the crystallization chamber. The same spraying conditions as in Example 1 were used. The produced fatty powder was then discharged from the crystallization chamber by means of a vibration device, was placed on a conveyor belt and was guided at a lower running speed through the after-crystallization zone. The duration of the after-crystallization treatment was 5 minutes. The fat powder was thereafter mixed in an analogous manner as in Example 1 with the same fine soybean flour. However, a fat concentration of 80 wt.% could not be reached because the fat powder formed lumps during the mixing process. Also the use of a lower fat concentration of only 50 wt.% did not produce a usable product. Only at a concentration of only 30 wt.% fat, or below, was the product usable. It felt wet but it was homogeneous. After being stored for 6 months, the product was no longer flowable and it was, in part, lumpy.

A pure fat powder produced by the procedure of this comparative example lost its powdery structure after 24 hours storage in a cool atmosphere, it could be mixed with other powdery substances only to a limited degree and only in a very small weight percentage.

Comparative Example 2

This example did not employ the after-treatment (ripening treatment) for the crystalline fat powder in order to determine whether or not the ripening treatment also is a necessary method step. A fat mixture of the same composition as in the Example 1 and Comparative Example 1 was prepared, was heated to 54°C., homogenized, cooled, tempered, again slightly heated and sprayed in the crystallization chamber, all under the same conditions as in Example 1, discharged from the chamber and was immediately mixed, without effecting the ripening treatment, with the carrier substance (fine soy bean flour). Substantially the same (nonusable) results as in Comparative Example 1 were thereby obtained. The amount of fat in the mixture had to be limited to 30 wt.% because a higher amount of fat resulted in an increase in the formation of lumps and the homogeneity of the product was reduced. Here too, the storage stability was not sufficient. The flowability was, in spite of the low amount of fat, not constant. The fat powder itself was very sensitive, could hardly be kept flowable for longer than 24 hours and showed a strong tendency for sticking together.

The examples show that only by carrying out all the method steps of the invention, namely the precrystallization, the main crystallization and the after-crystallization, the fat can be transformed into a mixable powder which has the desired characteristics even after a long storage.

In order to show that the method of the invention can be applied to fats and fat mixtures of different types and constituents, and is suitable for the manufacture of a large number of different products, and that the thereby applied method conditions can be varied within the ranges described above, a series of further tests were carried out. The conditions employed in these examples, unless otherwise stated, were the same as those described in Example 1 and using the same apparatuses. In the following examples, all percentages are % by weight.

Example 2

This example refers particularly to the manufacture of a fat crystalline powder suitable for the manufacture of filled milk.

Composition of fat mixture:
30% fish fat (hardened to a clear melting point of 40° to 42°C.; this property will be referred to hereinafter, briefly, as follows: "hardened 40/42");
20% palm oil;
20% soya bean oil (hardened 34/36);
17% coconut oil;
5% soya bean oil;
5% emulsifiers (monoglyceride and lecithin).

Characteristics of the fat mixture:
Clear melting point: 34.8°C.;
Congeal point : 25.1°C.;
Iodine value : 41.

The above fat mixture was, in the same manner as described in Example 1, melted, heated to about 49°C., then cooled quickly to 27.5°C, held for 20 minutes at said temperature while stirring, thereafter slowly again heated to approximately 29°C. (precrystallization treatment) and then was sprayed and crystallized as described in Example 1. The fat powder obtained in this manner was guided on a conveyor belt through a drying chamber in which the temperataure was +5°C. The running speed of the conveyor was regulated so that the fat powder remained for 200 seconds in the drying chamber (after-crystallization).

A portion of the thus obtained fat powder was filled by itself in paperboard boxes. The other portion was mixed with skim milk powder to obtain a filled milk product.

Both products had excellent characteristics, that is, they were capable of being stored, were easily flowable and remained perfectly mixable and flowable also after storage for 9 months.

For comparison, Example 2 was repeated twice, except that in one test there was no precrystallization treatment and in the other test there was no after-crystallization treatment. The products obtained by these comparison tests all had substantially poorer characteristics than the manufactured according to the invention.

Example 3

This example describes the manufacture of a fat powder which is suitable as a baking fat for the manufacture of bakingready flour.

Composition of the fat mixture:
45% palm oil;
40% soya bean oil (hardened 34/36);
9% palm oil (hardened 40/42);
5% soya bean oil;
1% emulsifiers (monoglyceride).

Characteristics of the fat mixture:
Clear melting point: 37.4°C.;
Congeal point: 26.0°C.;
Iodine value: 47.

The above fat mixture was melted as described in Example 1, heated to 52.4°C., then cooled within approximately 30 minutes to 29°C., held for 10 minutes at that temperature, and thereafter slowly heated to 32°C. (precrystallization treatment) and thereafter sprayed in the same manner as described in Example 1 into the crystallization chamber (air temperature: −24°C.) so that the particle size of the sprayed fat was approximately 50 $\mu$m.

The after crystallization was done at +8°C. for a period of 5 minutes.

The particle size of the thus obtained fat powder, which consisted essentially of spherical particles, was all within a range of about ±10 $\mu$m. of a mean particle size value of 50$\mu$m. The fat powder was very suitable for the manufacture of flour ready for baking containing up to 30 wt.% of fat powder and, also, was suitable for making flour-fat compositions containing up to 60 wt.% of fat powder. Furthermore, it also had pure characteristics which as a rule are to be expected only from fat-free powdery products.

For comparison and to show the effect of the after-crystallization on the fat powder characteristics, a portion of the fat powder was directly withdrawn from the crystallization chamber and was brought into contact with the surrounding air, that is, it was not subjected to the after-crystallization step of the invention. From the thereby obtained fat powder, no flour fat concentrates containing up to 60 wt.% of fat powder could be manufactured and also flours ready for baking manufactured therefrom with a fat powder content of only 30 wt.% had clearly worse characteristics than the products obtained by the method of the invention.

Example 4

This example describes the manufacture of a fat powder for a cream powder which can readily be mixed with water.

Composition of the fat mixture:
60% peanut oil (hardened 34/36);
20% peanut oil (hardened 32);
14% soya bean oil (hardened 34/36);
1% peanut oil;
5% emulsifiers (glyceride bases).

Characteristics of the used fat mixture:
Clear melting point: 34.5°C.;
Congeal point: 25.4°C.;
Iodine value: 58.

This fat mixture was melted in the same manner as in Example 1, heated to approximately 39°C., then quickly cooled to 28°C., held 5 minutes at said temperature, thereafter heated slowly to 30°C. (precrystallization treatment) and then sprayed under conditions which resulted mainly in ballike particles with a particle size of below 50 μm. The temperature in the crystallization chamber was −28°C.

The after-crystallization or ripening treatment took place for four minutes at +5°C.

A fat powder with a powderlike structure was thereby obtained which was very well mixable with up to an amount of 80 wt. % with fat-free, powdery (pulverized) carrier substances. From this fat powder, different cream powders with fat powder contents of 40%, 60% and 80% were manufactured. All of them were homogeneous, easily flowable, transport-resistant and, at storage temperatures of up to 20°C., storage resistant. No difference could be found optically between the individual products with respect to the fat content since they all had substantially equal flow characteristics.

Example 5

This example describes the manufacture of butter fat powder suitable as a stable whole milk powder.

Starting fat material: 100% butter fat.
Characteristics of the butter fat:
Clear melting point: 33°C.;
Congeal point: 23°C.;
Iodine value: 36.

This butter fat was melted in the same manner as in Example 1, mixed with well known antioxidants in the usual amount, heated to 48°C., thereafter cooled quickly to 25°C., held with constant stirring for 25 minutes at this temperature, then slowly heated to 28°C. (precrystallation treatment) and thereafter sprayed. The temperature in the crystallization chamber was −25°C.

The fat powder carried out from the crystallization chamber was exposed to a 5 minute long ripening treatment at +10°C. and then was mixed with skim milk powder. The butter fat powder obtained in this manner was well suited for mixing with skim milk powder, with which it formed absolutely homogenous, dry mixtures which were well flowable, storage resistant and transport stable.

Since butter fat, as already mentioned, has particular characteristics, as comparison experiments there was carried out an experiment omitting the precrystallization treatment and an experiment omitting the after-crystallization step. The products of the comparison processes had in both cases clearly inferior quality in comparison with the products manufactured according to the invention.

Furthermore, the above examples were repeated with the change that the precrystallization is carried out each time in a continuously operating Astra pressure cooler. The fat melt could thereby be cooled down to lower temperatures than in the above examples without becoming stiff. The cooled fat mass was tempered only for a short time to dissolve undesired α and β' fat crystals and then was sprayed.

These tests show that the congeal point or rather the temperature at which a particular fat mixture solidifies is not exactly determined but varies in dependency on the apparatus used, the cooling-off speed etc. and for example through intensive stirring, can be reduced. In this mannere one can thus in the method of the invention prevent solidifying or congealing during the precrystallization treatment.

The embodiments of the invention in which an exclusive property or privilege is claimed are defined as follows:

1. A method for continuously converting fat that is completely solid at a temperature of approximately 20°C., into a crystalline, flowable, stable powder, comprising the steps of:
    1. heating the fat to a first temperature above, but not in excess of approximately 15°C. above, the clear melting point of the fat to melt the fat and then mixing same to form a homogeneous molten fat composition;
    2. thereafter chilling the homogeneous molten fat composition to a second temperature which lies in the lower third of the temperature range between the congeal point and the clear melting point of the homogeneous fat composition, the chilling being carried out at a rate effective to initiate the formation of a high concentration of high melting point β-fat crystal nuclei and to minimize the formation of relatively low melting point α and β'-fat crystal nuclei in the fat composition but without cooling the fat composition below the congeal temperature of the fat composition, and then maintaining the fat composition at the second temperature for a time period of from 2 to 30 minutes to complete the development of a high number of relatively high melting β-fat crystal nuclei in the fat composition;
    3. thereafter heating the fat composition up to a third temperature at which its viscosity is such that the fat composition is suitable for atomizing and spraying and to substantially dissolve any residual α β'-fat crystal nuclei in the fat composition and to avoid destruction of the β-fat crystal nuclei, the third temperature being no higher than approximately 10 percent below the clear melting point of the fat composition;
    4. then spraying the fat composition substantially free of α and β'-fat crystal nuclei and containing a high concentration of β'-fat crystal nuclei in the liquid phase into a crystallization chamber and therein contacting the sprayed fat composition with cool dry air by circulating through the crystallization chamber a stream of dehumidified air at a temperature of between about −15° to −30°C. to crystallize fat particles, the dew point of the stream of dehumidified air being below the lowest temperature in the crystallization chamber, whereby there is formed a flowable powder of crystalline fat particles of a small particle size and containing primarily the β crystalline form of fat;
    5. discharging the flowable fat powder from the crystallization chamber; and
    6. then ripening the fat powder in a ripening chamber in a dehumidified atmosphere at a fourth temperature of between about 0°C. to +10°C. for a ripening period of from approximately 0.5 to approximately 10 minutes, the dew point of the dehumidified atmosphere being below the lowest temperature in the ripening chamber.

2. A method according to claim 1, in which the starting fat also contains a powdery edible compatible adjunct for fats selected from the group consisting of emulsifiers, antioxidants, and non-fat dry milk solids.

3. A method according to claim 1, in which in step (2) the homogenous molten fat composition is held at said second temperature for a period of from about 4 to about 15 minutes.

4. A method according to claim 1, in which in step (2) the homogenous molten fat composition is held at said second temperature for a period of from about 5 to about 10 minutes.

5. A method according to claim 1, in which in step (4) the atomized fat particles are contacted with nitrogen to render same resistant to oxidation.

6. A method according to claim 1, in which in step (6) the fat powder is ripened for a period of from about 1 to about 8 minutes.

7. A method according to claim 1, in which in step (6) the fat powder is ripened for a period of from about 3 to about 5 minutes.

8. A method according to claim 1, in which after step (6) the fat powder is sprayed with liquid nitrogen to effect a secondary crystallization.

9. A method according to claim 8, in which in the secondary crystallization is effected at a temperature of from −25°C. to −30°C.

10. A method according to claim 8, in which after the secondary crystallization treatment the fat powder is subjected to tempering at a temperature of from about 0°C. to about 10°C. in a dry atmosphere for approximately 2 minutes.

11. A method according to claim 1, in which the fat powder is mechanically mixed with powdery edible material selected from the group consisting of skim milk powder, whey powder, starch powder flour, soybean flour, highly dispersed silicic acid and phosphates.

12. A method according to claim 1 in which the chilling is completed within about 30 minutes.

* * * * *